(12) United States Patent
Cohen et al.

(10) Patent No.: US 8,255,218 B1
(45) Date of Patent: Aug. 28, 2012

(54) DIRECTING DICTATION INTO INPUT FIELDS

(75) Inventors: Richard Zarek Cohen, London (GB); Luca Zanolin, London (GB); Marcus Alexander Foster, West Malling (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/245,698

(22) Filed: Sep. 26, 2011

(51) Int. Cl.
*G10L 11/00* (2006.01)
*G10L 15/00* (2006.01)
*G10L 17/00* (2006.01)

(52) U.S. Cl. ........ 704/248; 704/253; 704/270; 704/275; 709/200

(58) Field of Classification Search .................. None
See application file for complete search history.

(56) References Cited

U.S. PATENT DOCUMENTS

| | | | |
|---|---|---|---|
| 4,596,031 A | 6/1986 | Hakaridani et al. | |
| 4,726,065 A | 2/1988 | Froessl | |
| 5,600,765 A | 2/1997 | Ando et al. | |
| 5,749,072 A * | 5/1998 | Mazurkiewicz et al. | 704/275 |
| 5,970,452 A * | 10/1999 | Aktas et al. | 704/253 |
| 6,167,374 A * | 12/2000 | Shaffer et al. | 704/227 |
| 6,321,197 B1 * | 11/2001 | Kushner et al. | 704/270 |
| 6,421,672 B1 * | 7/2002 | McAllister et al. | 1/1 |
| 6,539,350 B1 * | 3/2003 | Walker | 704/233 |
| 6,915,258 B2 | 7/2005 | Kontonassios | |
| 7,177,814 B2 * | 2/2007 | Gong et al. | 704/270.1 |
| 7,287,018 B2 | 10/2007 | Lennon | |
| 2001/0018653 A1 | 8/2001 | Wutte | |
| 2004/0049388 A1 * | 3/2004 | Roth et al. | 704/251 |
| 2004/0073431 A1 * | 4/2004 | Galanes et al. | 704/270.1 |
| 2004/0230637 A1 * | 11/2004 | Lecoueche et al. | 709/200 |
| 2004/0243415 A1 * | 12/2004 | Commarford et al. | 704/275 |
| 2005/0102146 A1 | 5/2005 | Lucas et al. | |
| 2005/0251746 A1 | 11/2005 | Basson et al. | |
| 2006/0247925 A1 | 11/2006 | Haenel et al. | |
| 2007/0124507 A1 | 5/2007 | Gurram et al. | |
| 2008/0162143 A1 | 7/2008 | Agapi et al. | |
| 2011/0097693 A1 | 4/2011 | Crawford | |

OTHER PUBLICATIONS

Plannerer, "An Introduction to Speech Recognition," [online] Mar. 28, 2005. Retrieved from the Internet: <http://www.speech-recognition.de/pdf/introSR.pdf> 69 pgs.

Rabiner, "A Tutorial on Hidden Markov Models and Selected Applications in Speech Recognition," [online]. Proceedings of the IEEE, vol. 77, No. 2, Feb. 1989, Retrieved from the Internet: <http://www.ece.ucsb.edu/Faculty/Rabiner/ece259/Reprints/tutorial%. 20on%20hmm%20and%20applications.pdf> 30 pgs.

(Continued)

*Primary Examiner* — Justin Rider
(74) *Attorney, Agent, or Firm* — Shumaker & Sieffert, P.A.

(57) ABSTRACT

In general, this disclosure describes techniques to direct textual characters converted from vocal input into selected graphical user interface input fields. Vocal input may be received. Textual characters may be identified based on the vocal input. A first portion of the textual characters corresponding to a first portion of the vocal input may be graphically inputted into a first input field of a GUI. While receiving the vocal input, a selection by of a second input field in the GUI may be accepted after the first portion of the vocal input has been received. After accepting the selection of the second input field, a second portion of the textual characters corresponding to a second portion of the vocal input received after the selection of the second input field may be inputted into the second input field.

30 Claims, 7 Drawing Sheets

OTHER PUBLICATIONS

Rabiner et al., "Speech Recognition: Statistical Methods," [online], 2006, Retrieved from the Internet: <http://courses.cs.tamu.edu/rgutier/cpsc.689_s07/rabinerJuang2006statisticalASRoverview.pdf> 18 pgs.

Stoicke et al., "Recent Innovations in Speech-to-Text Transcription at SRI-ICSI-UW," [online]. IEEE Transactions on Audio, Speech, and Language Processing, vol. 14, No. 5, Sep. 2006. Retrieved from the Internet: <http://www.icsi.berkeley.edu/pubs/speech/UWSRIICSI.pdf> 16 pgs.

"How to Switch or Change Input Method on Android Smart Phone Device," [online]. My Digital Life, Jul. 2, 2010. Retrieved from the Internet: <http://www.mydigitallife.info/2010/07/02/how-to-switch-or-change-input-method-on-android-smart-phone-device/> 7 pgs.

"env touch Voice Recording," [online], Verizon Wireless Community: Mobile Devices: Cell Phone—General Devices Questions, Oct. 2009. Retrieved from Internet: <http://community.vzw,com/t5/Cell-Phone-General-Devices/env-touch-Voice-Recording/m-p/97326> 2 pgs.

Vertanen et al, "Parakeet: A Continuous Speech Recognition System for Mobile Touch-Screen Devices," IUI'09, Feb. 8-11, 2009. Retrieved from the Internet: <http://www.keithv.com/pub/demoparakeet/demoparakeet.pdf> 10 pgs.

"Voice Recorder Touch | S60 5th Edition Mobiles App," [online]. Symbian Mobile Updates, Apr. 17, 2010. Retrieved from the Internet: <http://symbianpoint.com/voice-recorder-touch-s60-5th-edition-mobiles-app.html> 4 pgs.

"Voice memos, Go ahead, say what's on your mind," [online]. Apple iPod touch, 2010. Retrieved from the Internet: <http://www.apple.com/ipodtouch/features/voice-memos.html> 2 pgs.

\* cited by examiner

DIRECTING DICTATION INTO INPUT FIELDS

This application is related to Application No. 13/083,322 filed Apr. 8, 2011.

TECHNICAL FIELD

The disclosure relates generally toward speech or voice recognition.

BACKGROUND

Typically, a user may use a variety of methods to input information into a computing device, such as by typing on a keyboard or by using a pointing device, such as a mouse, a stylus, or the user's own fingers to interact with a graphical user interface presented by the computing device.

In certain situations, it may be desirable for the user to be able to interact with a computing device using speech as input. For example, in the context of mobile devices such as mobile phones, it may be easier for a user to input information into the mobile device via speech instead of having to type on a cramped virtual keyboard presented on the screen of the mobile device.

SUMMARY

In one example, the disclosure is directed towards a method performed by a computing device having one or more processors, memory, a microphone, and a display capable of displaying a graphical user interface (GUI). The method may include receiving a request from a user to activate a voice input capability of the computing device. The method may further include activating the voice input capability. The method may further include, while the voice input capability is active, performing, by the computing device, the steps of: receiving vocal input from the user, wherein at least a portion of the vocal input is intended for input into a first input field of the GUI displayed on the display; during the receiving of the vocal input, receiving a selection by the user of a second input field of the GUI displayed on the display; identifying vocal input received prior to the selection of the second input field as first vocal input intended for the first input field; identifying vocal input received after the selection of the second input field as second vocal input intended for the second input field; detecting that vocal input from the user has concluded; and deactivating the voice input capability. The method may further include graphically inputting a first text portion in the first input field, wherein the first text portion is based upon conversion of the first vocal input into textual characters by an automatic speech recognition (ASR) engine. The method may further include graphically inputting a second text portion in the second input field, wherein the second text portion is based upon conversion of the second vocal input into textual characters by the ASR engine.

In another example, the disclosure is directed to a method performed by a computing device having one or more processors, memory, a microphone, and a display capable of displaying a graphical user interface (GUI). The method may include receiving vocal input from the user, wherein at least a portion of the vocal input is intended for input into a first input field of the GUI displayed on the display. The method may further include during the receiving of the vocal input, receiving a selection by the user of a second input field of the GUI displayed on the display. The method may further include identifying vocal input received prior to the selection of the second input field as first vocal input intended for the first input field. The method may further include identifying vocal input received after the selection of the second input field as second vocal input intended for the second input field. The method may further include graphically inputting a first text portion in the first input field, wherein the first text portion is based upon conversion of the first vocal input into textual characters by an automatic speech recognition (ASR) engine. The method may further include graphically inputting a second text portion in the second input field, wherein the second text portion is based upon conversion of the second vocal input into textual characters by the ASR engine.

In another example, the disclosure is directed to a computing device. The computing device may include an output device configured to display a graphical user interface (GUI) including a first input field and a second input field. The computing device may further include a microphone configured to receive vocal input from a user, wherein at least a portion of the vocal input is intended for input into the first input field. The computing device may further include an input device configured to receive a selection by the user of the second input field. The computing device may also include an audio conversion module configured to identify vocal input received prior to the selection of the second input field as first vocal input intended for the first input field, and to identify vocal input received after the selection of the second input field as second vocal input intended for the second input field. The computing device may also include a input field module configured to graphically input a first text portion in the first input field, wherein the first text portion is based upon conversion of the first vocal input into textual characters by an automatic speech recognition (ASR) engine, and to graphically input a second text portion in the second input field, wherein the second text portion is based upon conversion of the second vocal input into textual characters by the ASR engine.

In another example, the disclosure is directed to a computer-readable medium containing instructions. The instructions may cause a programmable processor to perform operations including receiving vocal input from a user, wherein at least a portion of the vocal input is intended for input into a first input field of a graphical user interface (GUI) displayed on a display. The instructions may also cause a programmable processor to perform operations including, during the receiving of the vocal input, receiving a selection by the user of a second input field of the GUI displayed on the display. The instructions may also cause a programmable processor to perform operations including identifying vocal input received prior to the selection of the second input field as first vocal input intended for the first input field. The instructions may also cause a programmable processor to perform operations including identifying vocal input received after the selection of the second input field as second vocal input intended for the second input field. The instructions may also cause a programmable processor to perform operations including graphically inputting a first text portion in the first input field, wherein the first text portion is based upon conversion of the first vocal input into textual characters by an automatic speech recognition (ASR) engine. The instructions may also cause a programmable processor to perform operations including graphically inputting a second text portion in the second input field, wherein the second text portion is based upon conversion of the second vocal input into textual characters by the ASR engine.

The details of one or more examples are set forth in the accompanying drawings and the description below. Other features, objects, and advantages will be apparent from the description and drawings, and from the claims.

DETAILED DESCRIPTION

In general, aspects of the present disclosure are directed to techniques for graphically inputting text into selected graphical user interface input fields based upon conversion of vocal input into textual characters by an automatic speech recognition (ASR) engine. For example, a user may be able to dictate speech into a microphone or other sound input device of a computing device, and may be able to select input fields, such as text input fields presented on a user interface, to indicate the input fields where the user would like to direct the text based upon conversion of vocal input into textual characters by an ASR engine.

Typically, when using voice recognition to dictate text into input fields during execution of a computer application, a user may select a first input field, dictate into a microphone or other sound input device on a computing device, and wait for a voice recognition process to finish processing the dictation and to input the identified textual characters from the dictation into the first input field before selecting the next input field and repeating the process until the desired input fields are filled out. In some examples, the user may have to manually turn on and turn off the voice recognition process upon selecting each input field. In some examples, the voice recognition process may be aborted for a first input field if the user selects a second input field before the process has had time to finish identifying textual characters for the dictated input for the first input field. In some other examples, the voice recognition process prevents the user from selecting a second input field before the process has had time to finish identifying textual characters from the dictated input for the first input field.

Aspects of the present disclosure may include a voice recognition process that may continue to execute on a computing device to receive a voice input and to convert vocal input into textual characters, while allowing the user to select input fields in a graphical user interface into which to input text without interrupting the voice recognition process. For example, the user may be able to activate a voice input capability, select a first input field in the graphical user interface, start dictating vocal input, and then be able to select a second input field, such as by contacting a representation of a field being displayed on touch-sensitive display, and to continue to dictate, with the portion of the user's dictation prior to selecting the second input field being inputted by the computing device into the first input field, and the portion of the user's dictation after selecting the second input field being inputted by the computing device into the second input field.

Figure 1:
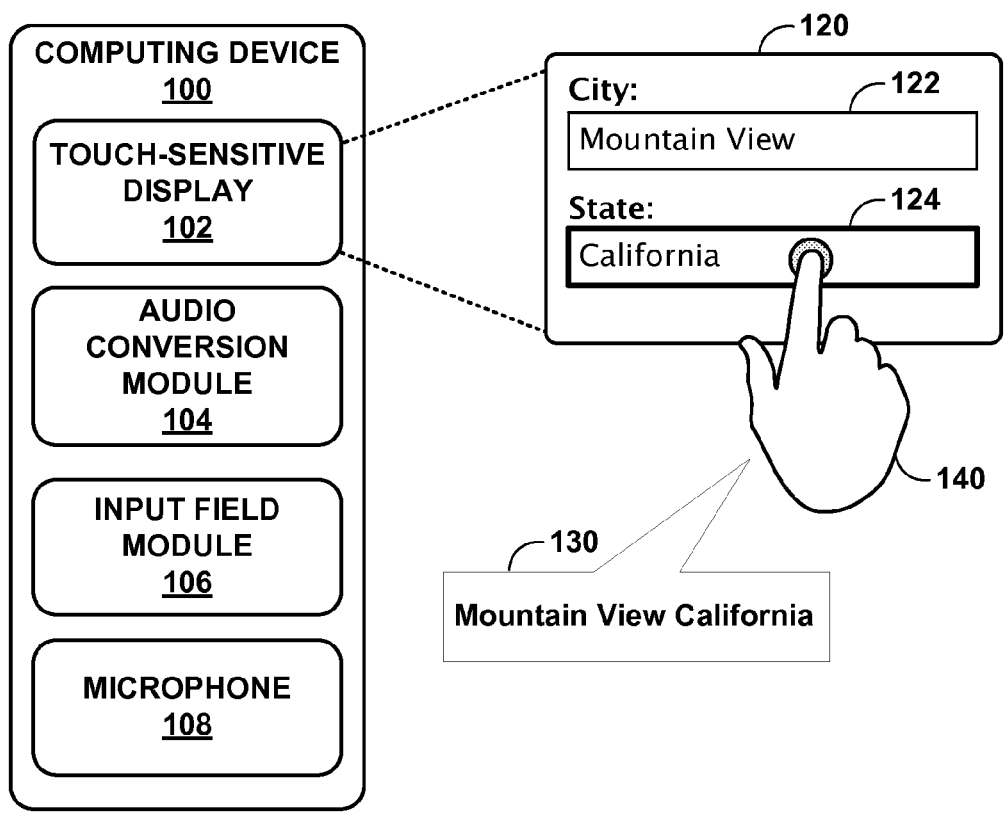
FIG. 1 is a block diagram illustrating an example of a computing device in accordance with some aspects of the present disclosure.

FIG. 1 is a block diagram illustrating an example of a computing device 100. As shown in FIG. 1, computing device 100 may include touch-sensitive display 102, audio conversion module 104, input field module 106, and microphone 108. Computing device 100, in some examples, includes or is a part of a portable computing device (e.g. mobile phone/ netbook/laptop/tablet device) or a desktop computer. Computing device 100 may also connect to a wired or wireless network using a network interface (see, e.g., FIG. 2). One non-limiting example of computing device 100 is further described in the example of FIG. 2.

In some examples, computing device 100 may include microphone 108. Microphone 108 may, in some examples, be configured to receive vocal input. Microphone 108 may, in some examples, include an acoustic-to-electric transducer or sensor that converts sound waves into one or more electrical signals. In some examples, microphone 108 may convert an electrical signal corresponding to a sound wave into a digital representation that may be used by computing device 100 in various operations. In some examples, microphone 108 may transmit data to various applications and components of computing device 100.

In some examples, computing device 100 includes one or more input devices. In some examples, an input device may be a touch-sensitive display 102. Touch-sensitive display 102, in one example, detects contact by an input unit, such as a finger, with touch-sensitive display 102. In some examples, touch-sensitive display 102 generates one or more signals corresponding to a location selected by a gesture performed on or near touch-sensitive display 102. In some examples, the gesture may be a physical touch of touch-sensitive display 102 to select the corresponding location. Touch-sensitive display 102, in some examples, generates a signal corresponding to the location of the input unit. Signals generated by the selection of the corresponding location are then provided as data to applications and other components of computing device 100.

In some examples, touch-sensitive display 102 may be configured to receive, while microphone 108 is receiving vocal input, a selection by a user 140 of second input field 124 after a first portion of the vocal input has been received. In some examples, touch-sensitive display 102 may be configured to detect contact by an input unit with an area of itself representing second input field 124 to receive a selection of second input field 124. In some examples, touch sensitive display 102 may be configured to detect contact with itself to receive a selection of second input field 124, where the contact corresponds with a gesture. In some examples, touch-sensitive display 102 is configured to receive a selection by user 140 of a first field 122 before a first portion of the vocal input is received by microphone 108.

In some examples, computing device 100 may include an output device, such as touch-sensitive display 102. In some examples, touch-sensitive display 102 may be programmed by computing device 100 to display graphical content. Graphical content, in general, may include any visual depiction displayed by touch-sensitive display 102. Examples of graphical content may include images, text, videos, visual objects, and/or visual program components such as scroll bars, text boxes, buttons, etc.

In one example, the touch-sensitive display 102 may display graphical user interface (GUI) 120. GUI 120 may include interactive and/or non-interactive graphical content that presents information of computing device 100 in human-readable form. In some examples GUI 120 enables user 140 to interact with computing device 100 through touch-sensitive display 102. For example, user 140 may contact an area of touch-sensitive display 102 representing second input field 122 of GUI 120. In response to receiving the gesture, an operation associated with second input field 122 may be executed by computing device 100. Alternatively, user 140 may perform a gesture on touch-sensitive display 102 that, when detected, causes the second input field 122 to be selected. Thus, GUI 120 may enable user 140 to create, modify, and/or delete data of computing device 100.

In some examples, GUI 120 may include one or more input fields. Examples of input fields, as shown in FIG. 1, may include first input field 122 and second input field 124. An input field may include any element of GUI 120 that may receive information from a user. Some examples of input fields may include text box controls and free form drawing controls. Input fields enable a user to enter input values into a computing device. In some examples, an input value may include any information the user enters into an input field. For example, as shown in FIG. 1, first and second input fields 122 and 124 may be text box controls. User 140 may provide input values for first and second input fields 122 and 124 that may be received by an application for further processing.

In some examples, audio conversion module 104 may convert vocal input received by microphone 108 into textual characters. In one example, audio conversion module 104 may initially receive digital audio data from microphone 108. For example, user 140 may speak the phrase "Mountain View Calif." 130, which is received as vocal input by microphone 108. Microphone 108 may convert the vocal input to digital audio data, which is received by audio conversion module 104. The digital audio data may include a digital representation of the vocal input. Audio conversion module 104 may identify one or more input values based on the digital audio data received from microphone 108 as textual characters. In some examples, audio conversion module 104 may include an ASR engine to convert vocal input into textual characters. In some examples, audio conversion module may communicate with an ASR engine residing on a remote computing device (e.g., the cloud) to convert vocal input into textual characters.

Thus, using the aforementioned techniques, audio conversion module 104 may convert vocal input received by microphone 108 into the textual characters "Mountain View Calif.". In this way, audio conversion module 108 may consequently generate the text "Mountain View Calif.". In some examples, audio conversion module 108 may send the text "Mountain View Calif." to input field module 106, which may assign all or a portion of the text to one or more input fields. Numerous techniques to identify input values, e.g., visual representations and/or operations, based on an audio signal are well-known in the art and may be implemented by audio conversion module 104.

In some examples, input field module 106 may detect when one of first and second input fields 122 and 124 is initially selected, and when the selected one of the first and second input fields 122 and 124 is subsequently deselected. In this way, input field module 106 may execute one or more operations in response to selections of one of the first and second input fields 122 and 124.

For example, user 140 may initially select first input field 122 by contacting an area of touch-sensitive display 102 representing first input field 122. Touch-sensitive display 102 may detect contact with the area of itself representing first input field 122 and may receive selection of first input field 122. Input field module 106 may determine that first input field 122 is selected and may perform one or more operations. User 140 may subsequently select second input field 124 by contacting an area of touch-sensitive display 102 representing second input field 124. Touch-sensitive display 102 may detect contact with the area of itself representing second input field 124 and may receive selection of second input field 124. Input field module 106 may determine that second input field 124 is now selected and that first input field 122 is no longer selected, and may perform one or more operations.

In some examples, audio conversion module 104 may execute on the computing device 100 as a background process, such as a system-level service, or may execute on the computing device 100 upon launch of an application using the audio conversion module 104. Once executing, audio conversion module 104 may receive digital audio data from microphone 108. In the current example, user 140 may speak the phrase "Mountain View Calif." 130, which may be received as vocal input by microphone 108. Audio conversion module 104 may receive digital audio data from microphone 108 that corresponds to the vocal input received by microphone 108. As the microphone 108 receives the vocal input and as audio conversion module 104 receives digital audio data from microphone 108, audio conversion module 104 may convert the digital audio data received from microphone 108 corresponding to the phrase "Mountain View Calif." 130 into textual characters. In some examples, audio conversion module 104 may communicate with an external system, such as an external system containing an ASR engine, to help in the conversion of the digital data received from microphone 108 into textual characters.

Input field module 106 may graphically input at least a portion of text based on the conversion of vocal input into the textual characters by audio conversion module 104 into first and second input fields 122 and 124 in the graphical user interface 120. For example, input field module 106 may store the textual characters converted by audio conversion module 104, e.g., "Mountain View Calif." in temporary or permanent storage of computing device 100. Input field module 106 may subsequently select an identifier, e.g., a pointer or reference, which identifies first or second input field 122 or 124. Input field module 106 may then associate with and/or assign a portion or all of the textual characters to the pointer or reference that identifies first or second input field 122 or 124. In this way a portion or all of the textual characters may be assigned to first or second input field 122 or 124.

In one example, input module 106 may assign the converted textual characters to the input field that was selected as microphone 108 begins to receive the vocal input. For example, if first input field 122 was selected when microphone 108 begins to receive the vocal input, then the characters identified by audio conversion module 104 may be assigned by input module 106 to first input field 122.

In one example, user 140 may be able to redirect a portion of the converted textual characters from the originally selected first input field 122 to second input field 124 by selecting second input field 124, such as by contacting an area of touch-sensitive display 102 representing second input field 124, as microphone 108 receives the vocal input. For example, user 140 may initially select first input field 122 before microphone 108 starts to receive the vocal input. After touch-sensitive display 102 receives the selection by user 140 of first input field 122, microphone 108 may receive vocal input, such as vocal input corresponding to the phrase "Mountain View Calif." 130 spoken by user 140. Audio conversion module 104 may be able to receive digital audio data from microphone 108 as microphone 108 receives the vocal input, and may convert the vocal input into textual characters. Input field module 106 may proceed to graphically input the converted textual characters into the currently selected first input field 122.

After a first portion of the vocal input, such as the "Mountain View" portion of the phrase "Mountain View Calif." 130 has been received by microphone 108, but before a second portion of the vocal input subsequent to the first portion, such as the remaining "California" portion of the phrase "Mountain View Calif." 130 has been received by microphone 108, user 140 may contact an area of touch-sensitive display 102 representing second input field 124 to select second input field 124. After touch-sensitive display 102 receives the selection of second input field 124, second input field 124 may be designated as the currently selected input field, and first input field 122 may no longer be designated as the currently selected field. If microphone 108 receives a second portion "California" of the vocal input after receiving the selection of second input field 124 as the currently selected input field, then a second portion of converted textual characters corresponding to the second portion "California" of the vocal input may be graphically inputted by input field module 106 into second input field 124. In this way, a user may be able to redirect the vocal input into input fields by selecting the input field the user wishes to redirect a portion of the vocal input.

In some examples, touch-sensitive display 102 may receive the selection of second input field 124 as the currently selected input field within GUI 120 after the first portion "Mountain View" of the vocal input has been received by microphone 108, but before the textual characters of "Mountain View" has been converted by the audio conversion module 104 as a first portion of textual characters, and/or before the first portion of textual characters has been graphically inputted by input field module 106 into first input field 122. In this example, audio conversion module 104 and input field module 106 may continue to execute and to process the first portion "Mountain View" of the vocal input, and to graphically input the first portion of textual characters corresponding to the first portion "Mountain View" of the vocal input into first input field 122 even after first input field 122 is no longer the currently selected input field within GUI 120.

In some examples, audio conversion module 104 may be able to segment vocal input into utterances, and may be able to identify which utterance should be inputted into which input field. In the context of the phrase "Mountain View Calif." 130, the audio conversion module 104 may segment the vocal input with phrase "Mountain View Calif." 130 into a first portion "Mountain View" of the vocal input and a second portion "California" of the vocal input, and may identify, such as by tagging, the first portion "Mountain View" of the vocal input as intended for first input field 122, and the second portion "California" of the vocal input as intended for second input field 124.

In some examples, touch-sensitive display 102 may receive the selection of second input field as microphone 108 receives a pause within the vocal input. In this example, the portion of vocal input before the pause may be identified as being intended for first input field 122, and the portion of vocal input after the pause may be identified as being intended for second input field 124.

In some examples, touch-sensitive display 102 may receive the selection of second input field 124 in the middle of a word being uttered by a user into microphone 108, meaning that the vocal input received by microphone 108 concurrent to receiving the selection of second input field is not a pause within the vocal input. In this example, the portion of vocal input, including the vocal input received concurrent to receiving the selection by the user of the second input, and ending at a pause within the vocal input may be considered to be part of the portion of vocal input that may be identified as being intended for first input field 122. Thus, a word that is being uttered as the user selects a second input field 124 may be considered as intended for first input field 122.

Various aspects of the disclosure may provide, in certain instances, one or more benefits and/or advantages. For example, a user may be able to simply redirect the voice input and corresponding converted textual characters into a input field by selecting the desired input field, such as by touching a representation of the desired input field outputted by a touch-sensitive display, so that portions of the voice input received by the computing device after the user selects the desired input field may be inputted into the desired input field. Thus, aspects of the present disclosure may provide a smooth experience for a user dictating input into a computing device.

Aspects of the disclosure may also provide, in certain instances, a potential benefit of being able to continually convert vocal input into textual characters for input into a target input field even after the target input field is no longer the currently selected input field. Thus, textual characters may be converted and inputted into the target input field even as the computing device continues to receive the vocal input for input as textual characters into other input fields.

Figure 2:
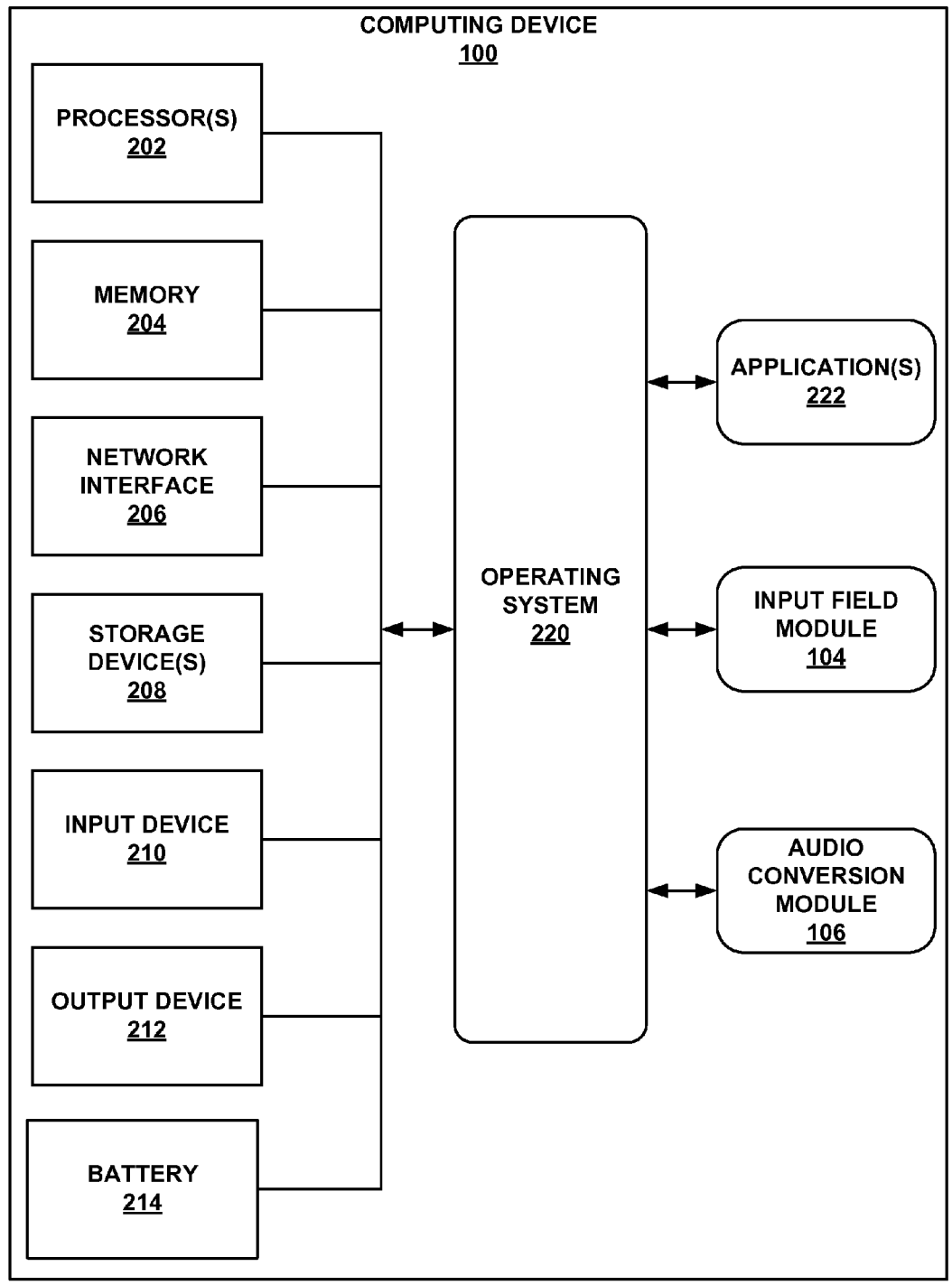
FIG. 2 is a block diagram illustrating further details of the example of the computing device shown in FIG. 1, in accordance with some aspects of the present disclosure.

FIG. 2 is a block diagram illustrating further details of one example of the computing device shown in FIG. 1, in accordance with one or more aspects of the present disclosure.

FIG. 2 illustrates only one particular example of the computing device, and many other examples of the computing device may be used in place of the example computing device illustrated in FIG. 2.

As shown in FIG. 2, computing device 100 may include one or more processors 202, memory 204, a network interface 206, one or more storage devices 208, input device 210, output device 212, and battery 214. Computing device 100 may also include an operating system 220. In one example, computing device 100 may further include one or more application(s) 222, input module 104, and audio conversion module 106 that may all be executed on one or more processors 202 of computing device 100. Each of components 202, 204, 206, 208, 210, 212, 214, 216, 218, and 220 may be interconnected (physically, communicatively, and/or operatively) for inter-component communications.

Processors 202, in one example, may be configured to implement functionality and/or process instructions for execution within computing device 100. For example, processors 202 may be capable of processing instructions stored in memory 204 or instructions stored on storage devices 208. In one example, processors 202 may be configured to execute operating system 220, applications 222, input field module 104, and audio conversion module 106.

Memory 204, in one example, may be configured to store information within computing device 100 during operation. Memory 204, in some examples, may be described as a computer-readable storage medium. In some examples, memory 204 may be a temporary memory, meaning that a primary purpose of memory 204 is not long-term storage. Memory 204, in some examples, may be described as a volatile memory, meaning that memory 204 does not maintain stored contents when the computing device 100 is turned off. Examples of volatile memories may include random access memories (RAM), dynamic random access memories (DRAM), static random access memories (SRAM), and other forms of volatile memories known in the art. In some examples, memory 204 may be used to store program instructions for execution by processors 202. Memory 204, in one example, may be used by software or applications running on computing device 100 (e.g., one or more applications 222, input field module 104, and audio conversion module 106) to temporarily store information during program execution.

Storage devices 208, in some examples, may also include one or more computer-readable storage media. Storage devices 208 may be configured to store larger amounts of information than memory 204. Storage devices 208 may further be configured for long-term storage of information. In some examples, storage devices 208 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 100, in some examples, may also include a network interface 206. Computing device 100, in one example, may use network interface 206 to communicate with external devices via one or more networks, such as one or more wireless networks. Network interface 206 may be a network interface card, such as an Ethernet card, an optical transceiver, a radio frequency transceiver, or any other type of device that can send and receive information. Other examples of such network interfaces may include Bluetooth®, 3G and Wi-Fi® radios in mobile computing devices as well as USB. In some examples, computing device 100 may use network interface 206 to wirelessly communicate with an external device (not shown) such as a server, mobile phone, or other networked computing device.

Computing device 100, in one example, may also include one or more input devices 210. Input device 210, in some examples, may be configured to receive input from a user through tactile, audio, or video feedback. Examples of input device 210 include a touch-sensitive display (e.g., touch-sensitive display 102 shown in FIG. 1), a mouse, a keyboard, a voice responsive system, video camera, microphone (e.g., microphone 108 as shown in FIG. 1) or any other type of device for detecting a command from a user.

Computing device 100, in one example, may also include one or more output devices 212. Output device 212, in some examples, may be configured to provide output to a user using tactile, audio, or video stimuli. Output device 212, in one example, may include a touch-sensitive display (e.g., touch-sensitive display 102 shown in FIG. 1), sound card, a video graphics adapter card, or any other type of device for converting a signal into an appropriate form understandable to humans or machines. Additional examples of output device 212 may include a speaker, a cathode ray tube (CRT) monitor, a liquid crystal display (LCD), or any other type of device that can generate intelligible output to a user.

Computing device 100, in some examples, may include one or more batteries 214, which may be rechargeable and provide power to computing device 100. Battery 214, in some examples, may be made from nickel-cadmium, lithium-ion, or other suitable material.

Computing device 100, in some examples, may include operating system 220. Operating system 220 may, in some examples, control the operation of components of computing device 100. For example, operating system 220 may, in one example, facilitate the interaction of applications 222 with processors 202, memory 204, network interface 206, storage device 208, input device 210, output device 212, battery 214, input field module 104, and audio conversion module 106.

Input field module 104 and audio conversion module 106 may each include program instructions and/or data that are executable on processors 202 of computing device 100. For example, input module 104 may include instructions to perform one or more of the operations and actions described in FIGS. 1-4. Similarity, audio conversion module 106 may include instructions to perform one or more of the operations and actions described in FIGS. 1-4. In some examples, input field module 104 and/or audio conversion module 106 may be a part of operating system 220 executing on computing device 100. Input field module 104 and audio conversion module 106 may also communicate with one or more external devices (not shown) to offload some of the processing performed by input field module 104 and audio conversion module 106 to the one or more external devices. In some examples, audio conversion module 106 may include an ASR engine. In some other examples, audio conversion module 106 may communicate with an ASR engine at a remote computing device.

Figure 3:
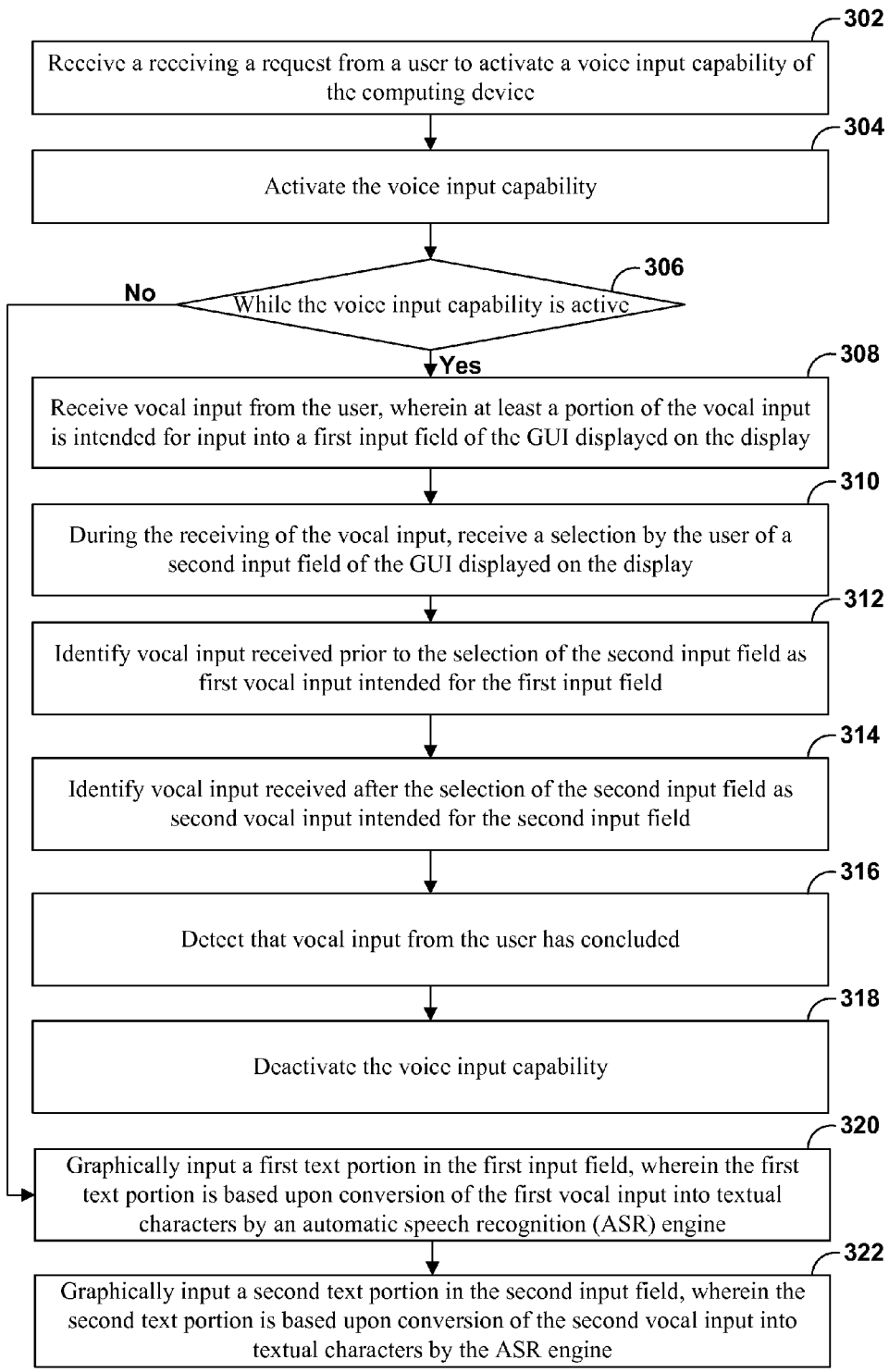
FIG. 3 is a flowchart illustrating an example method that may be performed by a computing device, in accordance with some aspects of the present disclosure.

Any applications, e.g., applications 222, implemented within or executed by computing device 100 may be implemented or contained within, operable by, executed by, and/or be operatively/communicatively coupled to components of computing device 100, such as processors 202, memory 204, network interface 206, and/or storage devices 208. FIG. 3 is a flow chart illustrating an example process that may be performed by a computing device, such as the computing device 100 illustrated in FIGS. 1 and 2. The process may include receiving a receiving a request from a user to activate a voice input capability of the computing device (302). The process may also include activating the voice input capability (304). The process may also include, while the voice input capability is active (306), performing, by the computing device, the steps of: receiving vocal input from the user, wherein at least a portion of the vocal input is intended for input into a first input field of the GUI displayed on the display (308); during the receiving of the vocal input, receiving a selection by the user of a second input field of the GUI displayed on the display (310); identifying vocal input received prior to the selection of the second input field as first vocal input intended for the first input field (312); identifying vocal input received after the selection of the second input field as second vocal input intended for the second input field (314); detecting that vocal input from the user has concluded (316); and deactivating the voice input capability (318). The process may also include graphically inputting a first text portion in the first input field, wherein the first text portion is based upon conversion of the first vocal input into textual characters by an automatic speech recognition (ASR) engine (320). The process may also include graphically inputting a second text portion in the second input field, wherein the second text portion is based upon conversion of the second vocal input into textual characters by the ASR engine (322).

Figure 4A:
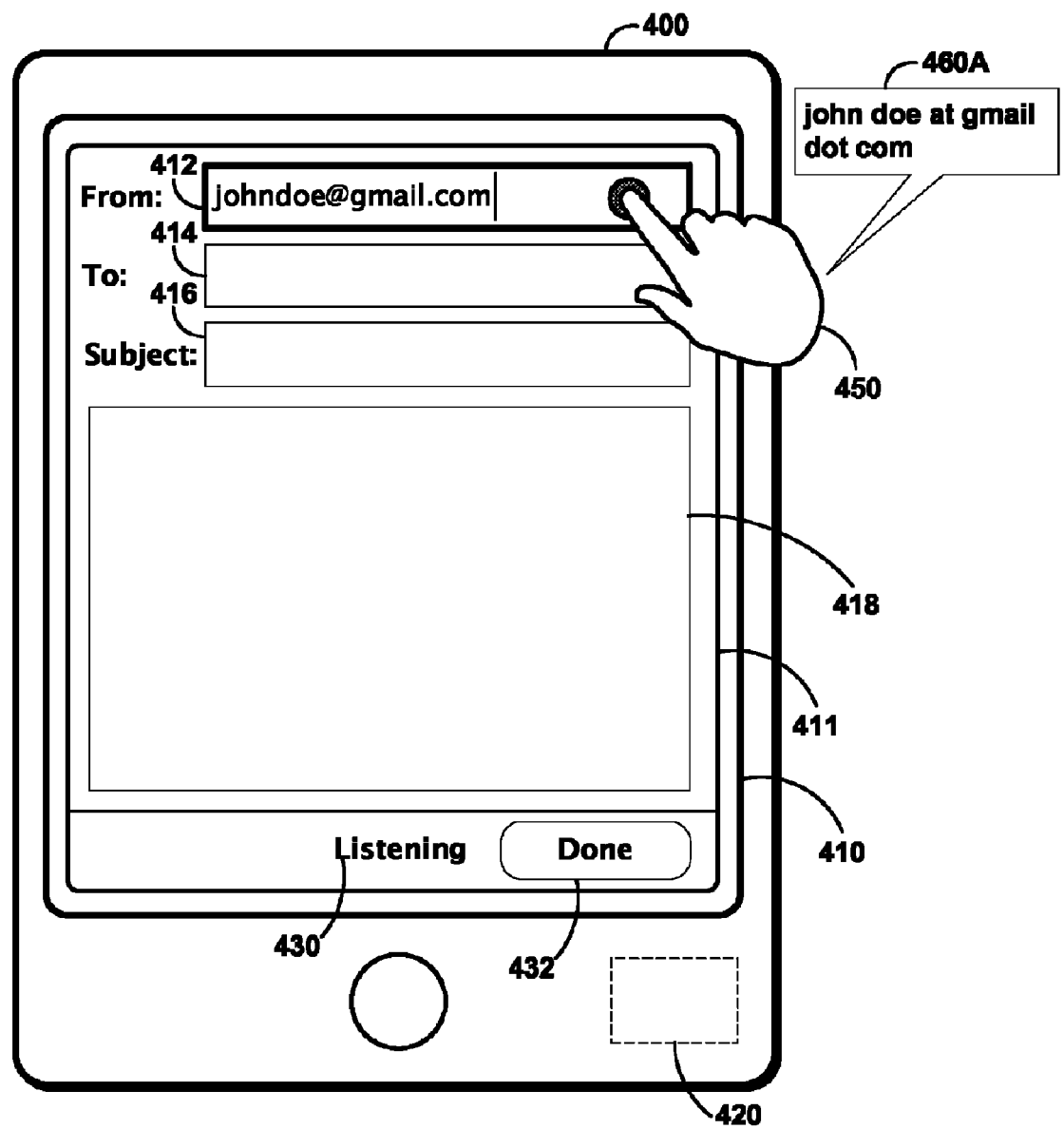
FIGS. 4A-D are block diagrams illustrating example techniques for directing vocal input into selected fields of an application executing on an example computing device, in accordance with some aspects of the present disclosure

FIGS. 4A-4D are block diagrams illustrating example techniques for directing vocal input into selected fields of an application running on an example computing device. As shown in FIG. 4A, example computing device 400 may include a microphone 420 configured to receive vocal input from user 450, and touch-sensitive display 410 configured to detect contact by user 450 as well as to output graphical user interface (GUI) 411.

In one example, GUI 411 may be an e-mail application. GUI 411 may include a first input field 412, a second input field 414, a third input field 416, and a fourth input field 418. In the context of the e-mail application presented by GUI 411, first field 412 may be a "From" field for inputting an originating e-mail address, second input field 414 may be a "To" field for inputting a destination e-mail address, third input field 416 may be a "Subject" field for inputting a subject line, and fourth input field 418 may be a "Message" field for inputting a message body for the e-mail message. The GUI 411 may also include audio conversion status 430 indicating whether an audio conversion module is running within computing device 400, and a GUI control, such as "Done" button 432, which may be selected to end operations of the audio conversion module.

User 450 may take advantage of voice recognition technology provided by the audio conversion module running within computing device 400 to input into and fill out the first, second, third, and fourth input fields 412, 414, 416, and 418, respectively, by speaking an originating e-mail address, a destination e-mail address, a subject, and the message body of the e-mail to be sent. For example, if user 450 wishes to input "johndoe@gmail.com" as the originating e-mail address, "janedoe@gmail.com" as the destination e-mail address, "New York" as the subject, and "Looking forward to meeting you" as the message body of the message, user 450 may continuously speak the phrases "john doe at gmail dot com", followed by "jane doe at gmail dot com", followed by "New York", and followed by "Looking forward to meeting you". Microphone 420 of computing device 400 may continuously receive the phrases spoken by user 450 as voice input. In some examples, user 450 may be able to speak the phrases at a continuous pace without pausing excessively between each phrase. In some examples, if computing device 400 detects a pause within the vocal input having a duration that exceeds a threshold time, such as a pause that lasts longer than 5 seconds, computing device 400 may detect that vocal input from the user has concluded and may deactivate its voice input capability.

In one example, user 450 may first contact the first input field 412 to select first input field 412. Touch-sensitive display 410 may detect contact by user 450 with an area of itself representing first input field 412, and may receive the selection by user 450 of first input field 412. After first input field 412 is selected, user 450 may speak the originating e-mail address "john doe at gmail dot com" 460A, and microphone 420 may receive the originating e-mail address "john doe at gmail dot com" 460A as a first portion of the vocal input.

Computing device 400 may perform voice recognition on the vocal input received by microphone 420 to convert vocal input into textual characters, including converting the first portion of the vocal input into a first portion of textual characters. In this case, computing device 400 may identify the originating e-mail address "john doe at gmail dot com" 460A as a first portion of textual characters "johndoe@gmail.com". Once converted, the computing device may graphically input the first portion of textual characters "johndoe@gmail.com" into the currently selected input field, which is first input field 412.

Figure 4B:
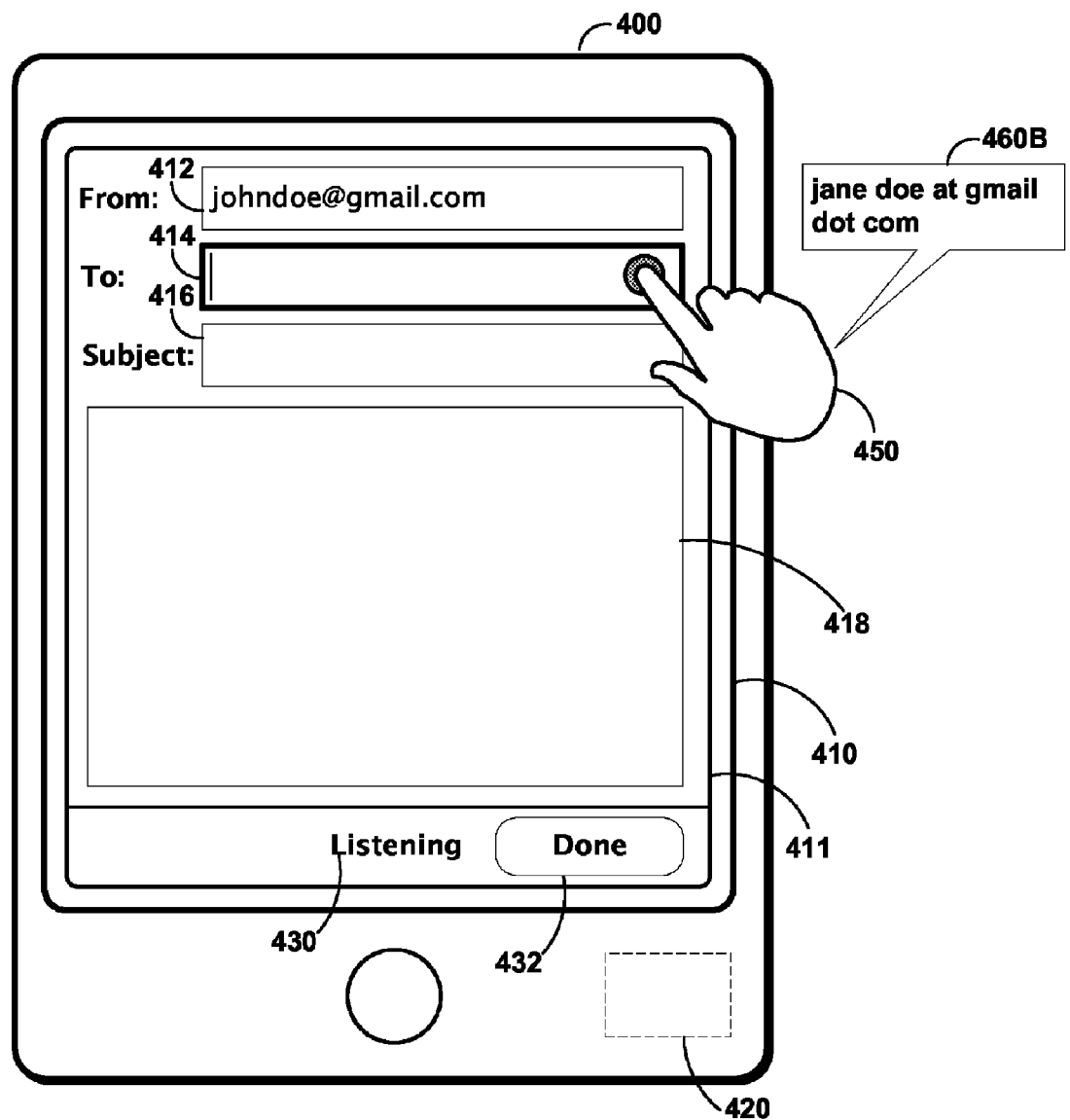

As shown in FIG. 4B, after user 450 has spoken the originating e-mail address "john doe at gmail dot com" 460A making up the first portion of the vocal input received by microphone 420, user 450 may contact second input field 414 to select second input field 414. Touch-sensitive display 410 may detect contact by user 450 with an area of itself representing second input field 414, and may receive the selection by user 450 of second input field 414. After second input field 414 is selected, user 450 may speak the destination e-mail address "jane doe at gmail dot com" 460B, and microphone 420 may receive the destination e-mail address "jane doe at gmail dot com" 460B spoken by user 450 as a second portion of the vocal input.

Computing device 400 may convert vocal input into textual characters, including converting the second portion of the vocal input into a second portion of textual characters. In this example, computing device 400 may identify the destination e-mail address "jane doe at gmail dot com" 460A as a second portion of textual characters "janedoe@gmail.com". Once converted, the computing device may graphically input the first portion of textual characters "janedoe@gmail.com" into the currently selected input field, which is second input field 414.

However, sometimes, vocal input may not be converted immediately into textual characters, so that, in one example, the second portion of textual characters "janedoe@gmail.com" may not immediately appear in second input field 414 after the second portion of the vocal input is received by microphone 420. Alternatively, the second portion of textual characters "janedoe@gmail.com" may appear in second input field 414 before third input field 416 is selected.

Figure 4C:
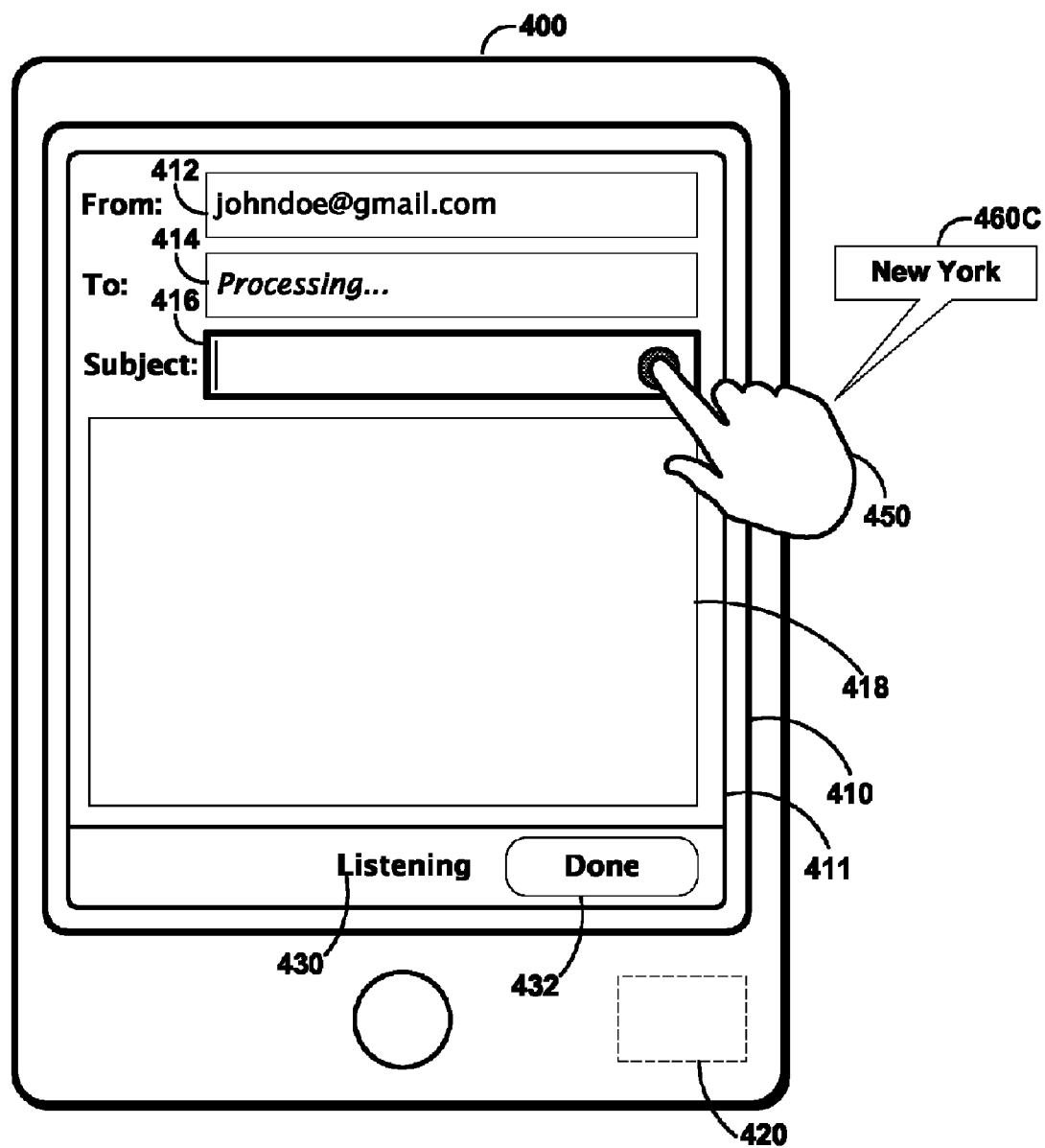

As shown in FIG. 4C, after user 450 has spoken the destination e-mail address "jane doe at gmail dot com" 460B for input into second input field 414, user 450 may contact third input field 416 to select third input field 416. Touch-sensitive display 410 may detect contact by user 450 with an area of itself representing third input 416, and may receive the selection by user 450 of third input field 416.

In this example, computing device 400 still has not inputted the second portion of textual characters "janedoe@gmail.com" into second input field 414. Instead, a status message, such as a "Processing" status text, may be displayed in second input field 414 to indicate that the computing device 400 is still processing the second portion of the vocal input to convert the second portion of vocal input into textual characters.

Although computing device 400 may still be processing the second portion of the vocal input to identify the second portion of textual characters to be graphically inputted into second input field 414, computing device 400 may still accept selection of third input field 416. After third input field 416 is selected, user 450 may speak the subject "New York" 460C, and the microphone 420 may receive the subject "New York" 460C as a third portion of the vocal input. In one example, processing of the second portion of the vocal input or identification of the second portion of textual characters to be graphically inputted into second field 414 is not interrupted by computing device 400 receiving selection of another input field, or microphone 420 receiving another portion of the vocal input.

Computing device 400 may convert vocal input into textual characters, including converting the third portion of vocal input into textual characters. In this case, computing device 400 may identify the subject "New York" 460C as a third portion of textual characters "New York". Once identified, the computing device may graphically input the third portion of textual characters "New York" into the currently selected input field, which is third input field 416. However, converting vocal input into textual characters may sometimes not occur immediately. Therefore the third portion of textual characters "New York" may not immediately appear in third input field 416. In some examples, the third portion of textual characters "New York" may appear in third input field before fourth input field 418 is selected.

Figure 4D:
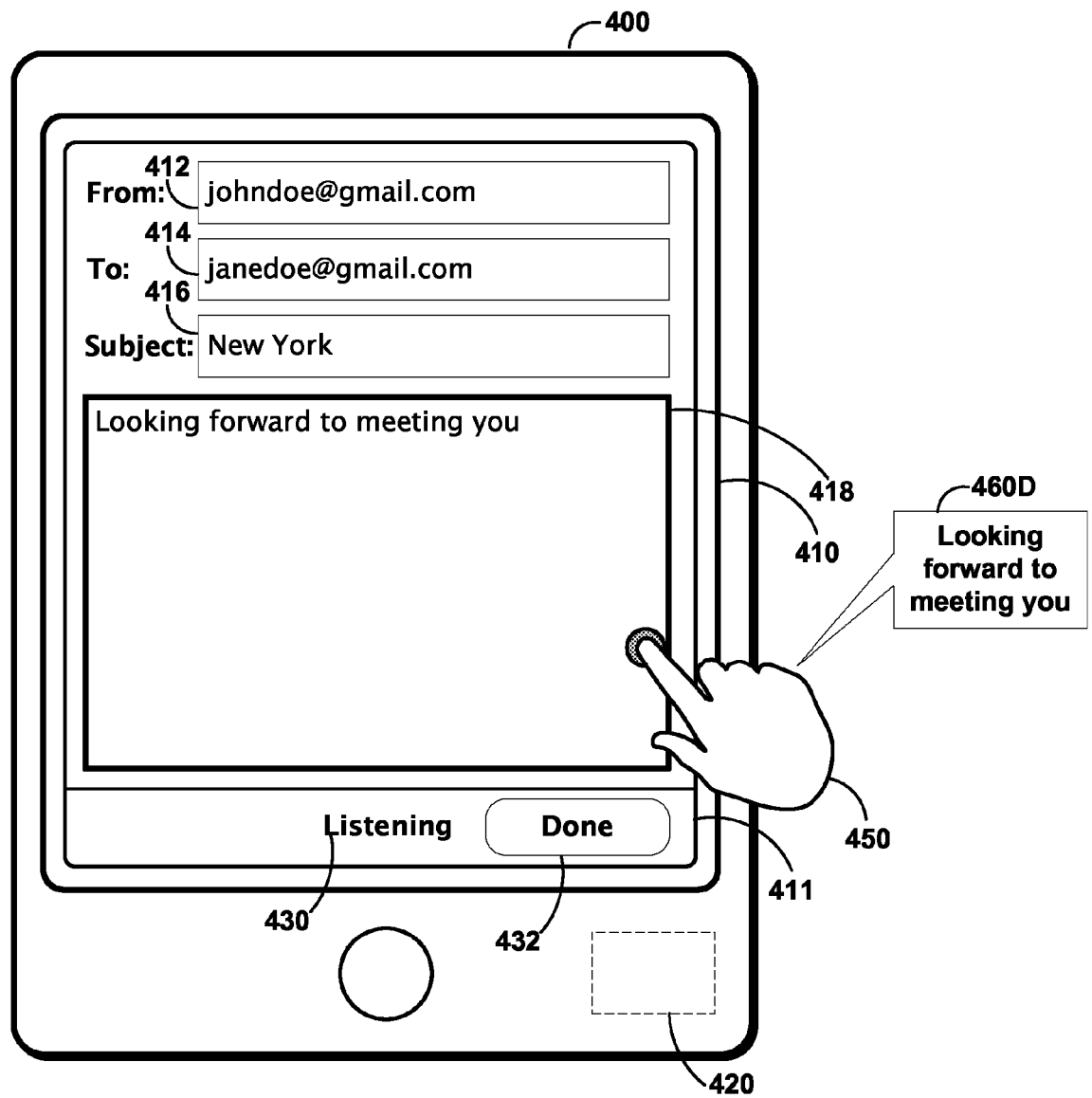

As shown in FIG. 4D, after user 450 has spoken the subject "New York" 460C, user 450 may contact fourth input field 418 to select fourth input field 418. Touch-sensitive display 410 may detect contact by user 450 with an area of itself representing fourth input field 418, and may receive the selection by user 450 of fourth input field 418.

In this example, the second portion of textual characters "janedoe@gmail.com" has been graphically inputted by computing device 400 into second input field 414 and the third portion of textual characters "New York" has been graphically inputted by computing device 400 into third input field 416 after the computing device 400 accepted the selection by user 450 of fourth input field 418. Thus, computing device 400 may continue to receive the vocal input, to convert the vocal input into textual characters, and to graphically input the textual characters into fields, even as the computing device 400 accepts selection of one or more other input fields by user 450.

After fourth input field 418 is selected, user 450 may speak the message body "Looking forward to seeing you" 460D, and microphone 420 may receive the message body "Looking forward to seeing you" 460D as a fourth portion of the vocal input.

Computing device 400 may convert the vocal input into textual characters, including converting the fourth portion of the vocal input into a fourth portion of textual characters. In this case, computing device 400 may identify the message body "Looking forward to seeing you" 460D as a fourth portion of textual characters "Looking forward to seeing you". Once identified, the computing device may graphically input the fourth portion of textual characters "Looking forward to seeing you" into the currently selected input field, which is the fourth input field 418.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of aspects of the disclosure have been described. These and other embodiments are within the scope of the following claims.

The invention claimed is:

1. A method performed by a computing device having one or more processors, memory, a microphone, and a display capable of displaying a graphical user interface (GUI), the method comprising:
   receiving a request from a user to activate a voice input capability of the computing device;
   activating the voice input capability;
   while the voice input capability is active, performing, by the computing device, the steps of:
      receiving vocal input from the user, wherein at least a portion of the vocal input is intended for input into a first input field of the GUI displayed on the display;
      during the receiving of the vocal input, receiving a selection by the user of a second input field of the GUI displayed on the display;
      identifying vocal input received prior to the selection of the second input field as first vocal input intended for the first input field;
      identifying vocal input received after the selection of the second input field as second vocal input intended for the second input field;
      detecting that vocal input from the user has concluded; and
      deactivating the voice input capability;
   graphically inputting a first text portion in the first input field, wherein the first text portion is based upon conversion of the first vocal input into textual characters by an automatic speech recognition (ASR) engine; and
   graphically inputting a second text portion in the second input field, wherein the second text portion is based upon conversion of the second vocal input into textual characters by the ASR engine.

2. The method of claim 1, wherein the ASR engine executes on the one or more processors.

3. The method of claim 1, wherein the ASR engine executes on a remote computing device.

4. The method of claim 1, further comprising:
   displaying a status message in the second input field prior to graphically inputting the second text portion in the second input field.

5. The method of claim 1, wherein the detecting further comprises:
   receiving a selection by the user of a control of the GUI.

6. The method of claim 1, wherein the detecting further comprises:
   detecting a pause within the vocal input having a duration that exceeds a threshold time.

7. The method of claim 1, wherein:
   if the vocal input received concurrent to receiving a selection by the user of a second input field of the GUI is not a pause within the vocal input, identifying, as a part of first vocal input intended for the first input field, a portion of the vocal input including the vocal input received concurrent to receiving the selection by the user of the second input and ending at a pause within the vocal input.

8. The method of claim 1, further comprising:
    during the receiving of the vocal input, receiving a selection by the user of a third input field of the GUI displayed on the display after receiving the selection by the user of the second input field;
    identifying vocal input received after the selection of the third input field as third vocal input intended for the third input field;
    graphically inputting a third text portion in the third input field, wherein the third text portion is based upon conversion of the third vocal input into textual characters by the ASR engine.

9. The method of claim 8, wherein graphically inputting the first text portion in the first input field occurs after receiving the selection by the user of the third input field.

10. The method of claim 1, wherein graphically inputting the first text portion in the first input field occurs after receiving the selection by the user of the second input field.

11. The method of claim 1, wherein receiving the selection by the user of the second input field comprises:
    detecting contact with an area of a touch-sensitive display of the computing device representing the second input field.

12. The method of claim 1, wherein receiving the selection by the user of the second input field comprises:
    detecting contact with a touch-sensitive display of the computing device, the contact corresponding with a gesture.

13. A method performed by a computing device having one or more processors, memory, a microphone, and a display capable of displaying a graphical user interface (GUI), the method comprising:
    receiving vocal input from the user, wherein at least a portion of the vocal input is intended for input into a first input field of the GUI displayed on the display;
    during the receiving of the vocal input, receiving a selection by the user of a second input field of the GUI displayed on the display;
    identifying vocal input received prior to the selection of the second input field as first vocal input intended for the first input field;
    identifying vocal input received after the selection of the second input field as second vocal input intended for the second input field;
    graphically inputting a first text portion in the first input field, wherein the first text portion is based upon conversion of the first vocal input into textual characters by an automatic speech recognition (ASR) engine; and
    graphically inputting a second text portion in the second input field, wherein the second text portion is based upon conversion of the second vocal input into textual characters by the ASR engine.

14. The method of claim 13, wherein the ASR engine executes on the one or more processors.

15. The method of claim 13, wherein the ASR engine executes on a remote computing device.

16. The method of claim 13, further comprising:
    displaying a status message in the second input field prior to graphically inputting the second text portion in the second input field.

17. The method of claim 13, wherein:
    if the vocal input received concurrent to receiving a selection by the user of a second input field of the GUI is not a pause within the vocal input, identifying, as a part of first vocal input intended for the first input field, a portion of the vocal input including the vocal input received concurrent to receiving the selection by the user of the second input and ending at a pause within the vocal input.

18. The method of claim 13, further comprising:
    during the receiving of the vocal input, receiving a selection by the user of a third input field of the GUI displayed on the display after receiving the selection by the user of the second input field;
    identifying vocal input received after the selection of the third input field as third vocal input intended for the third input field;
    graphically inputting a third text portion in the third input field, wherein the third text portion is based upon conversion of the third vocal input into textual characters by the ASR engine.

19. The method of claim 18, wherein graphically inputting the first text portion in the first input field occurs after receiving the selection by the user of the third input field.

20. The method of claim 13, wherein graphically inputting the first text portion in the first input field occurs after receiving the selection by the user of the second input field.

21. The method of claim 13, wherein receiving the selection by the user of the second input field comprises:
    detecting contact with an area of a touch-sensitive display of the computing device representing the second input field.

22. The method of claim 13, wherein receiving the selection by the user of the second input field comprises:
    detecting contact with a touch-sensitive display of the computing device, the contact corresponding with a gesture.

23. A computing device comprising:
    an output device configured to display a graphical user interface (GUI) including a first input field and a second input field;
    a microphone configured to receive vocal input from a user, wherein at least a portion of the vocal input is intended for input into the first input field;
    an input device configured to receive a selection by the user of the second input field;
    an audio conversion module configured to identify vocal input received prior to the selection of the second input field as first vocal input intended for the first input field, and to identify vocal input received after the selection of the second input field as second vocal input intended for the second input field; and
    a input field module configured to graphically input a first text portion in the first input field, wherein the first text portion is based upon conversion of the first vocal input into textual characters by an automatic speech recognition (ASR) engine, and to graphically input a second text portion in the second input field, wherein the second text portion is based upon conversion of the second vocal input into textual characters by the ASR engine.

24. The computing device of claim 23, wherein:
    the output device configured to display the GUI including a third input field;
    the input device is configured to receive a selection by the user of the third input field;
    the audio conversion module configured to identify vocal input received after the selection of the third input field as third vocal input intended for the third input field; and
    the text module is configured to graphically input a third text portion in the third input field, wherein the third text portion is based upon conversion of the third vocal input into textual characters by the ASR engine.

25. The computing device of claim 24, wherein:
the input field module is configured to graphically input the first portion of the textual characters into the first input field after the input device accepts the selection of the third input field by the user.

26. The computing device of claim 23, wherein:
the input field module is configured to graphically input the first portion of the textual characters into the first input field after the input device accepts the selection of the second input field by the user.

27. A non-transitory computer-readable medium comprising instructions for causing a programmable processor to perform operations comprising:
receiving vocal input from a user, wherein at least a portion of the vocal input is intended for input into a first input field of a graphical user interface (GUI) displayed on a display;
during the receiving of the vocal input, receiving a selection by the user of a second input field of the GUI displayed on the display;
identifying vocal input received prior to the selection of the second input field as first vocal input intended for the first input field;
identifying vocal input received after the selection of the second input field as second vocal input intended for the second input field;
graphically inputting a first text portion in the first input field, wherein the first text portion is based upon conversion of the first vocal input into textual characters by an automatic speech recognition (ASR) engine; and
graphically inputting a second text portion in the second input field, wherein the second text portion is based upon conversion of the second vocal input into textual characters by the ASR engine.

28. The non-transitory computer-readable medium of claim 27, wherein the instructions cause the processor to perform further operations comprising:
during the receiving of the vocal input, receiving a selection by the user of a third input field of the GUI displayed on the display after receiving the selection by the user of the second input field;
identifying vocal input received after the selection of the third input field as third vocal input intended for the third input field;
graphically inputting a third text portion in the third input field, wherein the third text portion is based upon conversion of the third vocal input into textual characters by the ASR engine.

29. The non-transitory computer-readable medium of claim 28, wherein the instructions that cause the processor to graphically input the first text portion in the first input field include instructions that cause the processor to graphically input the first text portion in the first input field after receiving the selection by the user of the third input field.

30. The non-transitory computer-readable medium of claim 27, wherein the instructions that cause the processor to graphically input the first text portion in the first input field include instructions that cause the processor to graphically input the first text portion in the first input field after receiving the selection by the user of the second input field.

* * * * *